Figure 3:
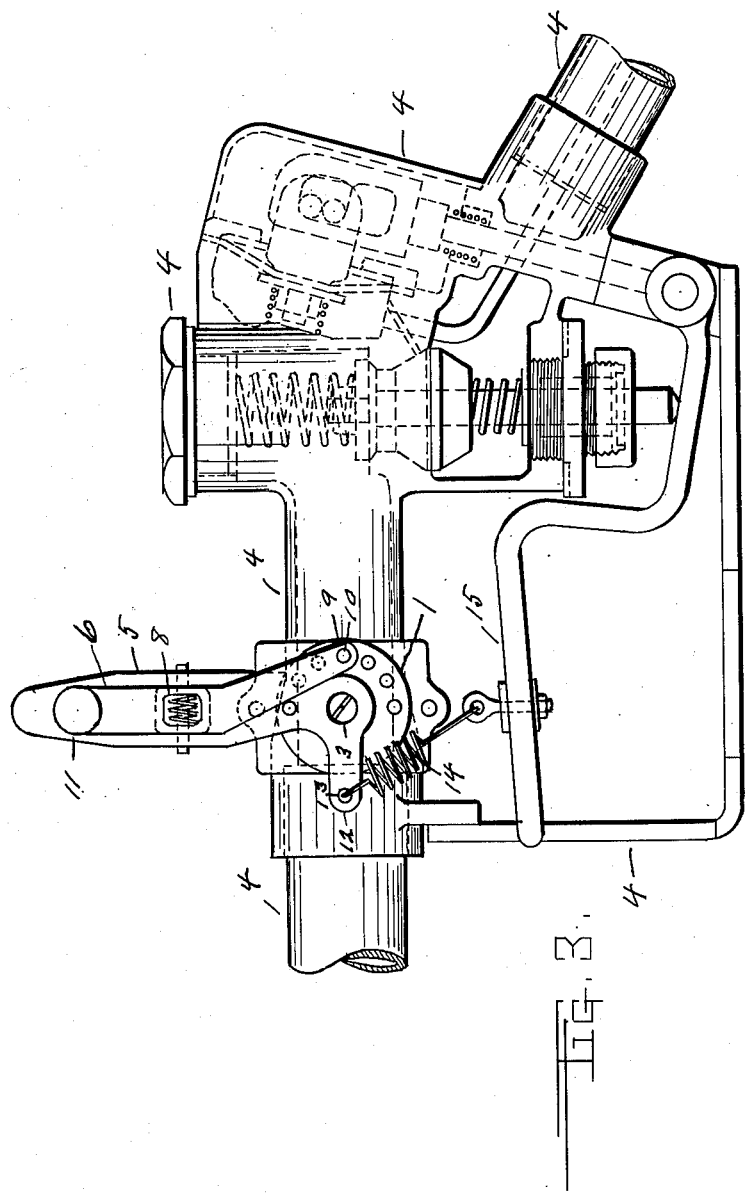

Sept. 18, 1951      J. B. SMITH      2,568,257
GASOLINE VALVE FLOW CONTROL
Filed May 7, 1947      2 Sheets-Sheet 1
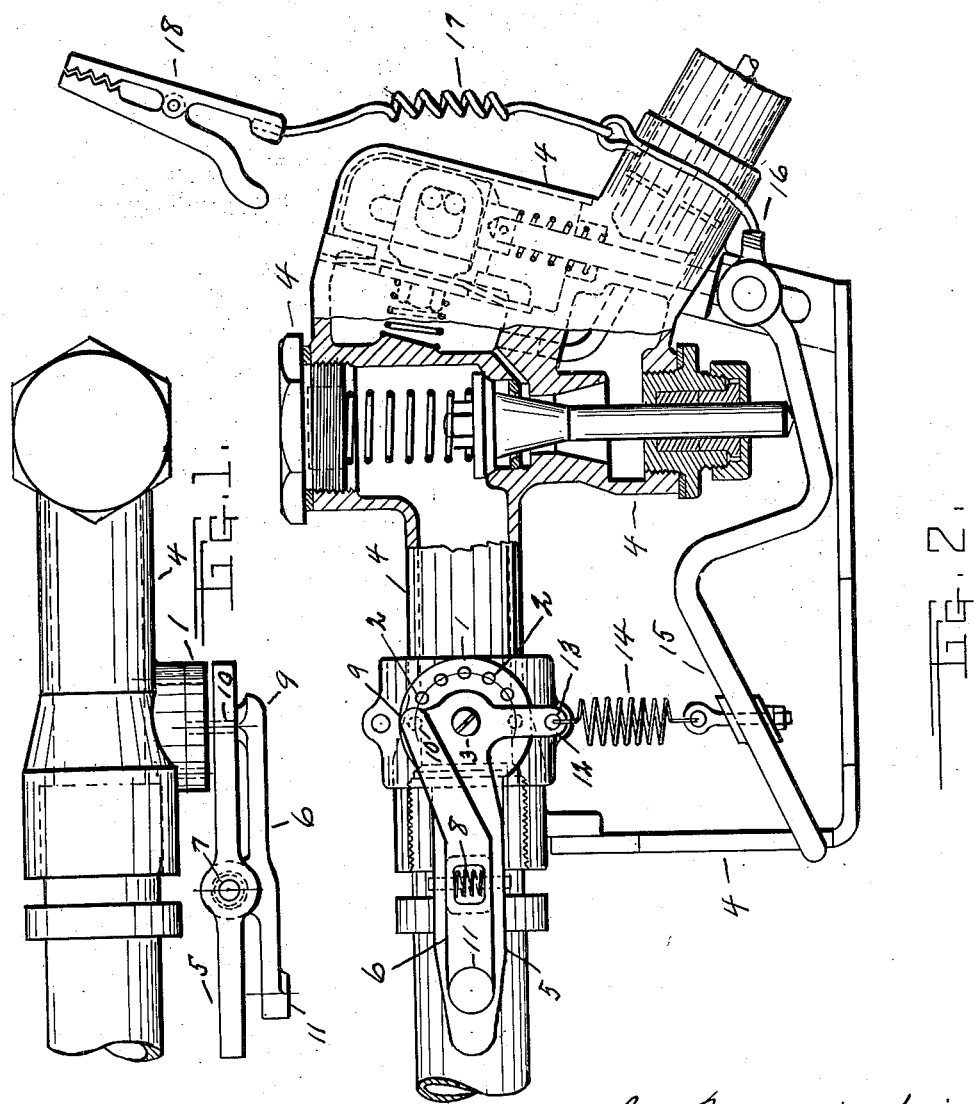

Sept. 18, 1951  J. B. SMITH  2,568,257
GASOLINE VALVE FLOW CONTROL

Filed May 7, 1947  2 Sheets-Sheet 2

John Benjamin Smith
INVENTOR.

BY Chas. Denegre
Attorney.

UNITED STATES PATENT OFFICE 2,568,257

GASOLINE VALVE FLOW CONTROL

John Benjamin Smith, Birmingham, Ala.

Application May 7, 1947, Serial No. 746,559

1 Claim. (Cl. 251—134)

This invention relates to a valve control device for use on gasoline supply valves having automatic shutoffs that are generally used on the hose lines of automobile filling stations. Such valves as now used require that the attendant supplying the gasoline must grip and hold the lever on the valve while gasoline is passing through the valve into the gasoline tank of the automobile. The main object of the present invention is to provide a control device that can be attached to any type of supply valve having an automatic shutoff now in use. When attached it can be set to allow flow of gasoline from minimum to maximum capacity of the valve and thus permit the attendant to give courtesy service to the customer while the gasoline is flowing into the automobile tank. Further objects are to provide such a device that will be highly efficient for its purpose, simple in structure, cheap to manufacture, and easy to install. Other objects and advantages will appear from the drawings and description.

By referring to the drawings, part of this application, it will be observed that Fig. 1 is a top plan view of part of a gasoline supply valve with the present control device attached; Fig. 2 is a side view of a regular gasoline supply valve with the control device attached in non-operating position; and Fig. 3 is a side view of the valve with the control device attached and showing it in operating position.

Similar reference numerals refer to similar parts throughout the several views.

Referring to the drawing in detail it will be seen that the control device comprises a disk 1 with a plurality of holes 2 that is attached by suitable bolt or nut means 3 to the side of the supply valve assembly 4 that is no part of this invention as it represents a conventional type valve now in general use. Mounted over the disk there is an arm member 5 that is revolvable approximately half the circumference of the disk on the same screw bolt or stud that fastens the disk to the valve body. Upon the arm there is a lever 6 with fulcrum 7 that is provided with a spring 8 that is set to urge one end 9 of the lever toward the disk. In the end of the lever a pin 10 is fixed that is adapted to register with and move into any one of the holes in the disk. The other end 11 of the lever is adapted to be pressed toward the revolvable arm in order to raise the pin on the other end of the lever out of any hole in the disk. The swingable arm has an integral extension 12 with hole or eye 13 in which one end of a coil spring 14 is attached with the other end of the spring fastened by any suitable means to the valve control lever handle 15. This coil spring is set at rest position as shown in Fig. 2. It is shown in operative position in Fig. 3. A link and spring and clip assembly 16, 17 and 18 is for the purpose of holding the valve supply nozzle in the supply pipe of an automobile supply tank where it is disposed to fall off or out of the tank pipe.

The dotted line mechanism in the figures is designed to lower the pivoted end of lever 15 from the position of Fig. 2 to that of Fig. 3 to permit the valve to cut-off when the level of gasoline in the tank reaches the discharge end of the nozzle. This is no part of the present invention as such valves have been in use for a long time. The present invention is for the purpose of slowing the flow of the gasoline to thus give the attendant additional time to look the car over, wipe the windshield and the like. The valve not so regulated would fill the tank fast as its flow would not be retarded by a partially opened valve. When the gasoline is allowed to flow fast it often backs up air in the tank resulting in some gasoline being forced out. With the conventional valve the attendant is required to hold and watch it in order to slow the flow.

From the foregoing it will appear that in use the swingable arm with lever thereon of the control is moved around to any position in its limit of travel where the pin in the lever end will register into one hole of the disk. Thus in Fig. 2 the control is shown at rest, and in Fig. 3 it is shown turned one quarter of the circumference of the disk. In this latter position the valve lever is pulled by the tension of the control spring to partially open position which would allow gasoline to flow at partial capacity of the valve except that the pivoted end of the control lever has been lowered by the gasoline in the tank whereby the supply valve is closed as shown. By moving the control arm further around on the disk the flow is increased. The control arm is the key feature of the device as its position regulates the capacity of the passage way through the valve.

The control device may be made of any material suitable for the purpose, but I prefer to use various kinds of metal. Also it may be made in different sizes to thus fit properly on various shapes and types of valves.

While I have shown and described the preferred embodiment of my invention, I do not wish to limit same to the exact and precise details of structure, but reserve the right to make all modifications and changes so long as they remain within the spirit and scope of the following claim.

Having described my invention, I claim:

In a gasoline valve control device of the character described in combination with a valve comprising; a valve contained within a main body, a metal disk attached to said body, the outer portion of approximately half of the disk having a plurality of holes therein and spaced substantially equal distance apart, a stud screw inserted through the center of the disk and holding the disk in fixed position on the said body, an arm member mounted with one end thereof swingable on the said stud screw, a lever mounted rockably on a fulcrum on said arm, a pin fixed in one end of the said lever and positioned and adapted to register with and fit into any one of said holes in the disk, a spring mounted in the said fulcrum and set normally to urge the pin of the lever into any hole in the disk, the other end of the lever adapted to be manually pressed toward the said swingable arm; an integral extension on the swingable arm with its major axis at a 90 degree angle compared with the major axis of the swingable arm, the outer end of the extension having a small hole therein, a coil wire spring having one end thereof swingably attached in the hole in the said extension; said valve having a main control lever, the other end of the said coil spring swingably attached to the free end of the said valve control lever, said spring being in normal rest condition when the arm extension is positioned nearest the valve control lever and in complete expanding condition when the said integral extension is farthest from the valve control lever.

JOHN BENJAMIN SMITH.

REFERENCES CITED

The following references are of record in the file of this patent:

UNITED STATES PATENTS

| Number | Name | Date |
|---|---|---|
| 1,998,221 | Conklin | Apr. 16, 1935 |
| 2,106,596 | Duff | Jan. 25, 1938 |
| 2,320,033 | Davis | May 25, 1943 |
| 2,367,138 | Payne | Jan. 9, 1945 |
| 2,418,280 | Steen | Apr. 1, 1947 |